(12) United States Patent
Rager et al.

(10) Patent No.: US 7,900,045 B2
(45) Date of Patent: Mar. 1, 2011

(54) METHOD TO AUTHENTICATE AN ACCESSORY

(75) Inventors: Kent D. Rager, Gurnee, IL (US); Joseph M. Hansen, Williams Bay, WI (US)

(73) Assignee: Motorola Mobility, Inc., Libertyville, IL (US)

( * ) Notice: Subject to any disclaimer, the term of this patent is extended or adjusted under 35 U.S.C. 154(b) by 959 days.

(21) Appl. No.: 11/617,003

(22) Filed: Dec. 28, 2006

(65) Prior Publication Data

US 2008/0159534 A1 Jul. 3, 2008

(51) Int. Cl.
*G06F 9/32* (2006.01)
(52) U.S. Cl. ............ 713/168; 713/170; 713/150
(58) Field of Classification Search ............ 713/168, 713/150, 170
See application file for complete search history.

(56) References Cited

U.S. PATENT DOCUMENTS

| 2005/0010782 A1 | 1/2005 | Ohkubo |
| 2005/0149740 A1 | 7/2005 | Kotzin et al. |
| 2005/0188206 A1 | 8/2005 | Kwok |

FOREIGN PATENT DOCUMENTS

WO 2005086158 A 9/2005

OTHER PUBLICATIONS

Rubinstein (Pub. No. US 200610156415 A1).*
A model for battery lifetime analysis for organizing applications on a pocket computer ; Rakhmatov, D.; Vrudhula, S.; Wallach, D.A.; Very Large Scale Integration (VLSI) Systems, IEEE Transactions on; vol. 11 , Issue: 6 Publication Year: 2003 , pp. 1019-1030.*
A round robin algorithm for an embedded electronic battery equalizer ; Hande, A.; Stuart, T.A.; Electro/Information Technology Conference, 2004. EIT 2004. IEEE Publication Year: 2004 , pp. 199-206.*
A microprocessor based intelligent battery charger; Dahlman, J.; Girard, S.; Miller, G.; Beede, D.; Curatolo, T.; Battery Conference on Applications and Advances, 1994., Proceedings of the Ninth Annual Publication Year: 1994 , pp. 185-190.*
N.M. Haller, "The S/Key One-Time Password", Symposium on Network and Distributed System Security, Dec. 30, 2004, USA.

* cited by examiner

*Primary Examiner* — David Y Jung
(74) *Attorney, Agent, or Firm* — Hisashi D. Watanabe; Douglas S. Rupert

(57) ABSTRACT

An apparatus (100) used by a plurality of devices to authenticate an accessory (120) is configured to operate with a device (110) of the plurality of devices. The accessory (120) applies an authentication algorithm to a key and a challenge (130) received from the device (110) and generates a response (132) thereto. A challenge and response memory (114) stores a subset of a set of challenges (232) and pre-computed responses (230). The enabling circuit transmits a challenge (130) to the accessory (120) and receives a received response (132) therefrom. The enabling circuit (112) also compares the received response (132) to the stored response (230) corresponding to the stored challenge (232) sent to the accessory (120). The enabling circuit (112) is configured to generate a normal operation enabling signal that enables normal operation of the device when the received response (132) matches the stored response and is configured not to generate the normal operation enabling signal when the received response (132) does not match the stored response.

17 Claims, 5 Drawing Sheets

METHOD TO AUTHENTICATE AN ACCESSORY

BACKGROUND OF THE INVENTION

1. Field of the Invention

The present invention relates to electronic devices, and, more specifically to a system for authenticating an accessory used with an electronic device.

2. Background of the Invention

Manufacturers of electronic devices (e.g. cellular telephones) have an interest in ensuring that accessories (e.g., batteries) operating with the devices meet the standards of the manufacturer. One way of doing this is to employ a system that authenticates accessories used with the manufactured devices.

To reduce the number of unauthorized accessories, certain relatively low-cost semiconductors enable an accessory to be authenticated by a device to which it is connected. These semiconductors typically contain a hashing function and a secret hashing key. To use such a system, both the authenticating device and the accessory have "pre-shared" knowledge of the secret hashing key. The authenticating device generates a seemingly random challenge message and sends it to the accessory. The accessory computes a hash over a combination of the secret hashing key, the received challenge message, and possibly additional padding data. Since the authenticating device knows the secret hashing key, it performs the same computation to determine the expected hash digest. The accessory returns the resulting digest value to the authenticating device, which compares an internally-calculated response to the response received from the accessory. If the expected and received hash digests match, then the device has been authenticated and normal operation of the device will be allowed. Such devices may be vulnerable because the authenticating device must store the secret hashing key value.

Another method of authentication uses public key encryption, that uses both a public key that is made publicly available and a private key that is stored only by the device. The public and private keys are inverses and are asymmetrical If the accessory were to store a private asymmetric key, the phone would send a random challenge to the accessory. The accessory would either encrypt or digitally sign the challenge using the private key and return it. The device would use a trusted public key either to decrypt the response and see if it matched what was sent, or to verify the signature on the response. However, implementing this in an accessory would add substantially to the cost of the accessory.

Certain devices lack the ability to store a key securely. Even in devices with a hardware-based capability of securing the value of the key, there is still a problem of how to provision the value of the key into the accessories in a secure manner.

There are several different techniques used to disable authentication algorithms in devices, including collision attacks and preimage attacks. A collision attack on a cryptographic hash tries to find two arbitrary inputs that will produce the same hash value, i.e., a hash collision. A hash collision is a situation that occurs when two distinct inputs into a hash function produce identical outputs. One desirable property of cryptographic hash functions is that it may be impractical to find a collision. Most hash functions have potential collisions, but with good hash functions they occur less often than with bad ones.

There are two types of preimage attacks: (1) a first preimage attack: given a hash h, find a message m such that hash(m)=h; and (2) a second preimage attack: given a fixed message m1, find a message m2 such that hash(m2)=hash(m1). A preimage attack differs from a collision attack in that there is a fixed hash or message that is being attacked. These attacks can be used by a sophisticated attacker to determine the value of the hashing key, or at least determine the expected response to a challenge, from such devices. Doing so could allow an attacker to make cloned or counterfeit devices.

Therefore, there is a need for a system that authenticates an accessory in which a key to authenticating an accessory cannot be derived from either the accessory or the device with which the accessory is used.

SUMMARY OF THE INVENTION

The disadvantages of the prior art are overcome by the present invention which, in one aspect, is an apparatus used by a plurality of devices to authenticate an accessory configured to operate with a device of the plurality of devices. The accessory stores a first key and employs an authentication circuit that applies an authentication algorithm to the first key and a challenge received from the device, thereby generating a response corresponding to the challenge. The apparatus includes a challenge and response memory and an enabling circuit. A challenge and response memory is in each device of the plurality of devices and stores a subset of a set of stored challenges and stored responses. Each stored response corresponds to a different one of the stored challenges and is pre-computed by applying the corresponding stored challenge and a second key to the authentication algorithm. The subset stored in the challenge and response memory of a first device of the plurality of devices is different from the subset stored in the challenge and response memory of a second device of the plurality of devices. The enabling circuit in each device of the plurality of devices transmits a stored challenge to the accessory and receives a received response therefrom. The enabling circuit also compares the received response to the stored response corresponding to the stored challenge sent to the accessory. The enabling circuit is configured to generate a normal operation enabling signal that enables normal operation of the device when the received response matches the stored response and is configured not to generate the normal operation enabling signal when the received response does not match the stored response.

In another aspect, the invention is a wireless telephone that includes a wireless telephone communication circuit, a battery, which powers the wireless telephone communication circuit, a memory and a processor. The battery stores a key and employing an authentication circuit that applies an authentication algorithm to the key and to a challenge received from the telephone so as to generate a response corresponding to the challenge. The memory stores a set of challenges and a set of pre-computed responses. Each response corresponds to a different challenge of the set of challenges. The processor transmits a selected challenge of the set of challenges to the battery and receives a response from the battery. The processor also compares the response received from the battery to a response stored in the memory corresponding to the challenge sent to the battery. The processor also causes a selected one of the battery and the wireless telephone communication circuit to operate in an other than normal operating state when the response received from the battery does not correspond to the response corresponding to the challenge stored in the memory.

In yet another aspect, the invention is a method of authenticating accessories configured to work with a device, in which an authentication algorithm is applied to a set of challenges and a key, thereby generating a corresponding set of responses. The set of challenges and the corresponding set of responses is stored in a memory associated with the device, without storing the key. A challenge is transmitted from the set of challenges to an accessory having circuitry that applies the challenge and the key to the authentication algorithm and that generates a response based on the challenge and the key. The response is received from the accessory and the response received from the accessory is compared to the response stored in the memory that corresponds to the challenge sent to the accessory. If the response received from the accessory matches the response corresponding to the challenge sent to the accessory, then normal operation of the device is enabled. Otherwise, normal operation of the device is not enabled.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
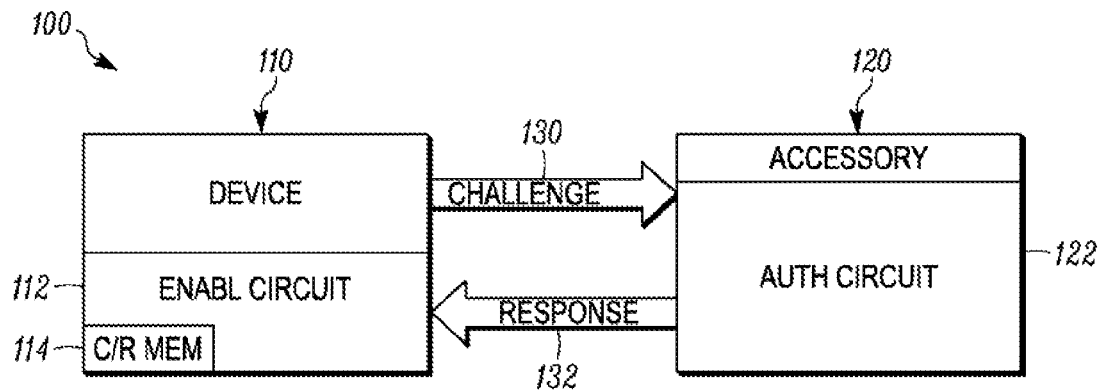
FIG. 1 is a schematic diagram showing one embodiment of a system for authenticating an accessory.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment includes an apparatus 100 used by a device 110 that works in cooperation with an accessory 120. The device 110 includes an enabling circuit 112 that is in communication with a challenge/response memory 114. The accessory 120 includes an authentication circuit 122 that manipulates data included in a challenge 130 received from the device 110 and that generates a response 132 based on the challenge 130 and a key stored by the accessory 120. When the device 110 transmits a challenge to the accessory 120, the accessory 120 generates a response thereto and transmits the response to the device 110. The device 110 compares the response to a response stored in the memory 114 and, if they are the same, allows normal operation of the device 110 and the accessory 120. If the responses are different, then normal operation of the device 110, the accessory 120, or both, is not allowed.

Figure 2A:
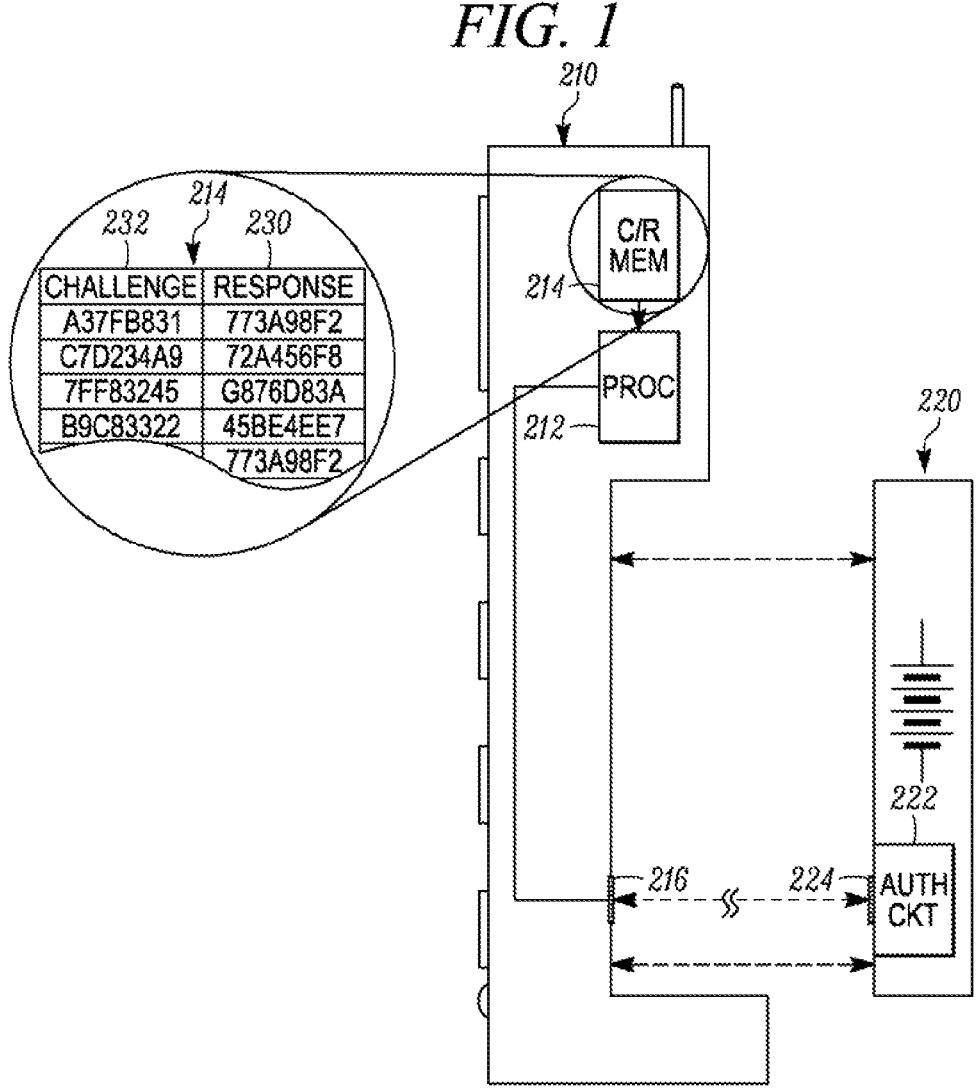
FIG. 2A is a schematic diagram showing a cellular telephone embodiment.

A wireless telephone-specific embodiment is shown in FIG. 2, in which the device is a cellular telephone 210 and the accessory is a battery unit 220 used to power the cellular telephone 210. The accessory includes an authentication circuit 222 that is coupled to an electrical contact 224 used to make contact with the telephone 210. The authentication circuit 222 applies an authentication algorithm to a challenge received from the telephone 210, along with a securely stored key, to generate a response that it transmits to the telephone 210. The authentication algorithm could include a cryptographic hashing algorithm or an encryption algorithm (such as, for example, a symmetric encryption algorithm or an asymmetric encryption algorithm). The telephone 210 includes a processor 212 or other type of logic circuit that is used to initiate an authentication action with the battery 220 through an electrical contact 216 (that may be electrically coupled to the contact 224 of the battery 220) and enable operation of the telephone 210. The processor 212 is in data communication with a memory 214 that stores a plurality of challenges 232 and pre-computed responses 230 (which are computed using an algorithm and key that is functionally the same as the algorithm and key employed by the accessory) each of which corresponds to a different one of the challenges 232.

The telephone 210 does not store the key used to compute the responses 230. Typically, during manufacture, the memory 214 is loaded with a subset of all possible challenges and their corresponding responses. Different telephones' memories 214 are loaded with different subsets of challenge/response pairs (which could be chosen using a pseudo-random process of a type well known to the art), thereby making it extremely difficult for a reverse engineer to create an accessory that would work with any randomly-selected telephone. For example, if each challenge included 32 bits (in the example shown), the complete set of possible challenges (and corresponding responses) would exceed four billion in quantity. A 64 bit challenge would give rise to over $1.8 \times 10^{19}$ permutations of challenges. Each telephone's memory 214 could be loaded with a pseudo-randomly selected subset of, for example, ten challenge/response pairs. In this scenario, the cost of examining enough telephones 210 to create a set of challenge/response pairs that would result in a high probability of a battery unit 220 being authenticated by a telephone 210, and the cost of storing the set in the battery unit 220, would make such a battery unit 220 prohibitively expensive.

When authenticating the battery 220, if the stored response does not correspond to the response received from the battery 220, then the telephone might allow the user to use the telephone 210 but not allow the battery 220 to be recharged, or the telephone 210 could be enabled only when the user is calling an emergency number. In another embodiment, the system could allow the battery to be recharged, but only to a level that is less than the maximum recharge level for the battery. Also, the telephone 210 could be completely disabled when the authentication fails. Many other non-normal operating states for the telephone 210 or the battery 220 are well known to the art and could be employed by this embodiment.

Figure 2B:
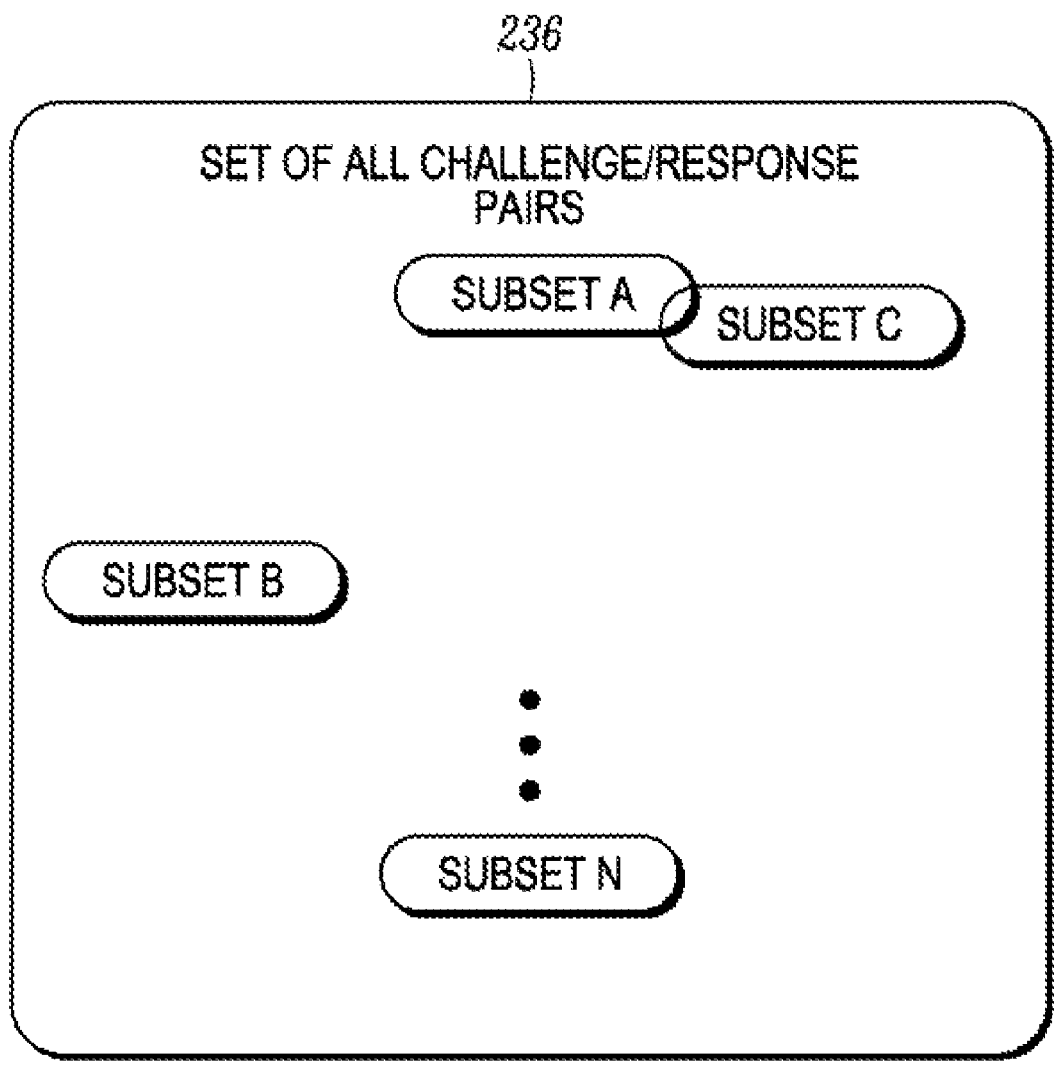
FIG. 2B is a Venn diagram showing the set of all possible challenge/response pairs and subsets thereof.
Figure 2C:
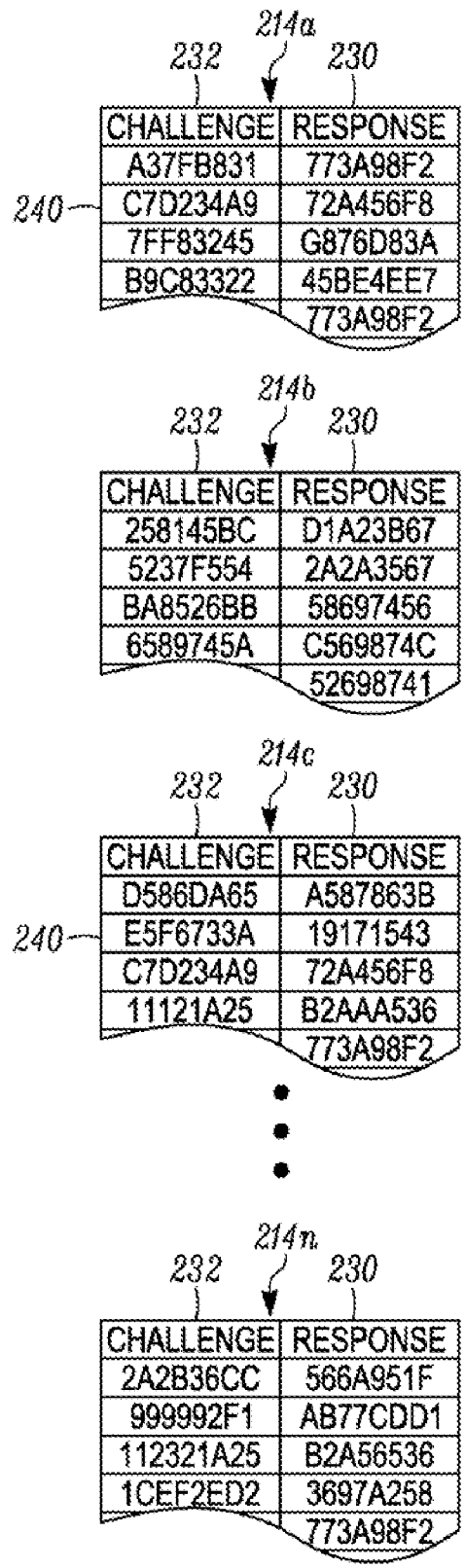
FIG. 2C is a schematic diagram showing challenge/response pairs corresponding to the subsets shown in the Venn diagram shown in FIG. 2B.

A Venn diagram 236 showing the set of all possible challenge/response pairs is shown in FIG. 2B. Different subsets of the set are possible and may even intersect each other (such as the case of subset A intersecting subset C, as shown). Several possible subsets 214a, 214b, 214c . . . 214n are shown in FIG. 2C. As can be seen subset 214a and subset 214c both employ challenge/response pair 240 and, thus, they intersect. A large number of challenge/response pairs may be generated and then assigned to different subsets through a pseudo-random assignment algorithm. By doing so, it becomes nearly impossible to predict which device stores which challenge/response pair.

Figure 3:
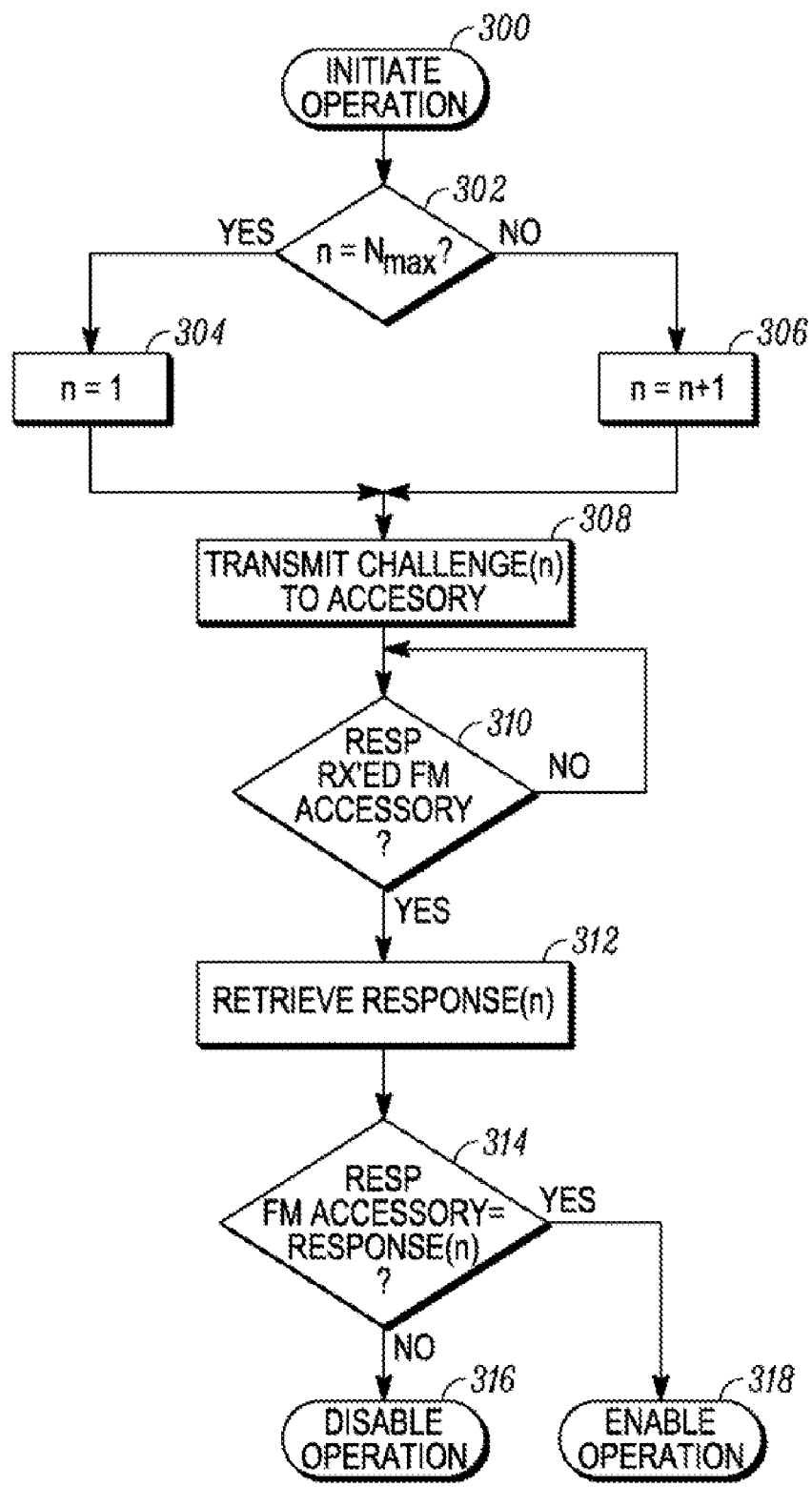
FIG. 3 is a flow chart showing one method for authenticating an accessory.

One embodiment of a method for authenticating an accessory is shown in FIG. 3, in which an authentication operation may be initiated 300 when a device is powered up. A test 302 is performed to determine if a last challenge/response pair has been used and, if so, the system resets a counter 304 so as to cause the system to recycle the set and begin with the first pair. Otherwise, the counter is incremented 306, thereby causing the system to use the next pair. Alternatively, the device could pseudo-randomly pick a challenge/response pair from the installed subset of pairs, rather that sequentially cycling through the pairs. The challenge is transmitted to the accessory 308 and the system waits to receive a response from the accessory 310. The response corresponding to the challenge sent to the accessory is retrieved from memory 312 and is compared to the response received from the accessory 314. If the responses do not match, then normal operation of the device is not enabled 316, otherwise the responses do match and normal operation of the device is enabled 318.

Figure 4:
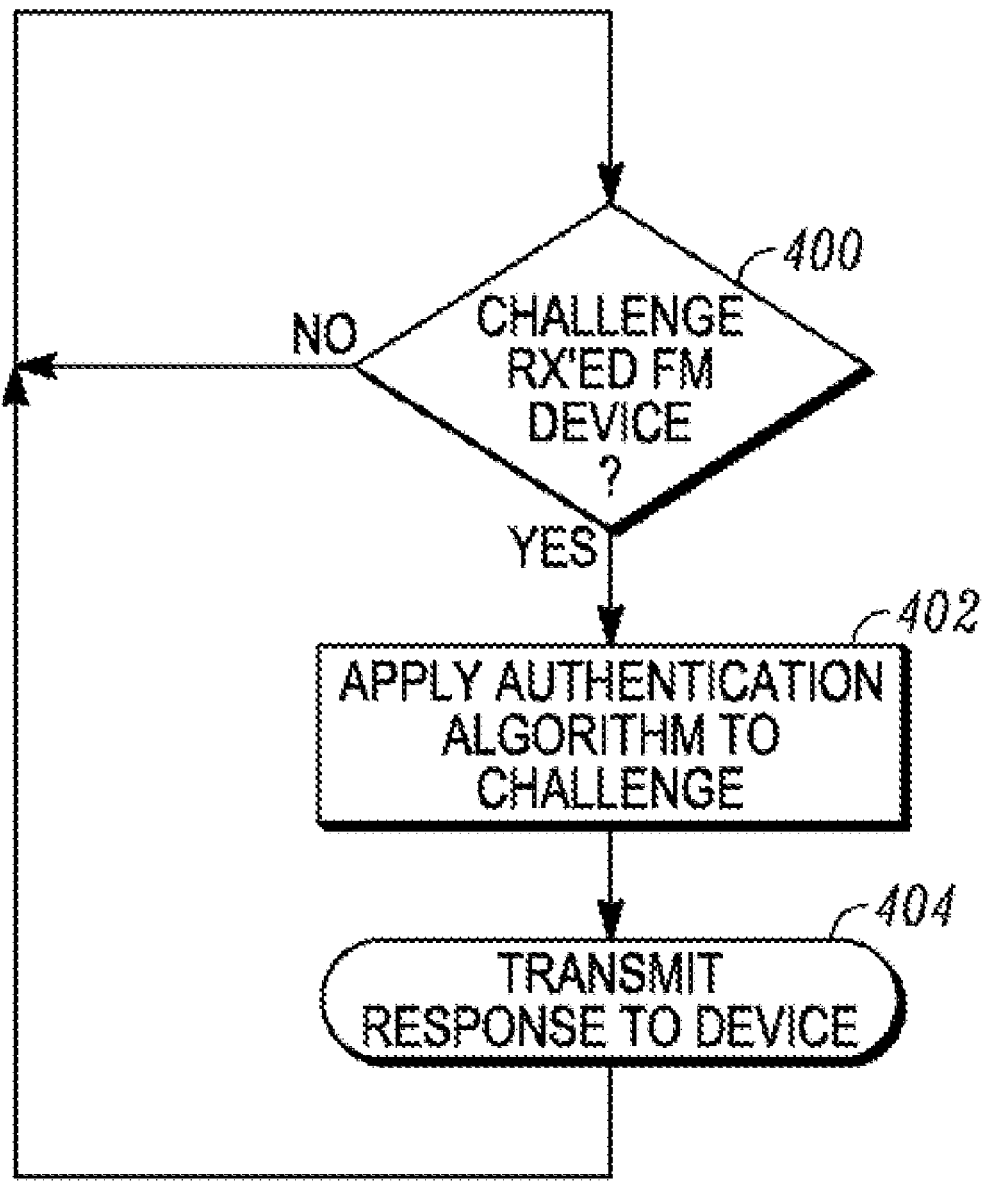
FIG. 4 is a flow chart showing an accessory acting in cooperation with the method shown in FIG. 3.

As shown in FIG. 4, the accessory initially waits to receive a challenge from the device 400. Once received, the system applies the authentication algorithm to the challenge and the key 402, thereby generating a response. The response is then transmitted 404 to the device.

This system provides an economical method of authenticating accessories. The embodiments shown could be used with computer batteries, computer cards in a computer mainframe, computer accessories, secure communications and many other systems that require authentication.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A battery recharging apparatus used by a plurality of devices to authenticate an accessory comprising a battery and configured to operate with a device of the plurality of devices, the accessory storing a first key and employing an authentication circuit that applies an authentication algorithm to the first key and a challenge received from the device thereby generating a response corresponding to the challenge, the apparatus comprising:
   a. a challenge and response memory in each device of the plurality of devices that stores a subset of a set of stored challenges and stored responses, each stored response corresponding to a different one of the stored challenges and pre-computed by applying the corresponding stored challenge and a second key to the authentication algorithm, the subset stored in the challenge and response memory of a first device of the plurality of devices being different from the subset stored in the challenge and response memory of a second device of the plurality of devices; and
   b. an enabling circuit in each device of the plurality of devices that transmits a stored challenge to the accessory and that receives a received response therefrom and that compares the received response to the stored response corresponding to the stored challenge sent to the accessory, wherein the enabling circuit is configured to charge the battery when the received response matches the stored response and is configured to not charge the battery when the received response does not match the stored response.

2. The apparatus of claim 1, wherein the challenge and response memory of each device stores a subset of a set of stored challenges and stored responses that are chosen to be included in the subset so as to make predicting which challenges and responses will be stored in the challenge and response memory of any given device of the plurality of devices difficult.

3. The apparatus of claim 2, where challenge/response pairs are assigned to the challenge and response memory of each device according to a pseudo-random algorithm.

4. The apparatus of claim 1, wherein the authentication algorithm comprises a cryptographic hashing algorithm.

5. The apparatus of claim 1, wherein the authentication algorithm comprises an encryption algorithm.

6. The apparatus of claim 5, wherein the encryption algorithm comprises a symmetric encryption algorithm.

7. The apparatus of claim 5, wherein the encryption algorithm comprises an asymmetric encryption algorithm.

8. The apparatus of claim 1, wherein the device comprises a cellular telephone.

9. The apparatus of claim 1, wherein the first key is identical to the second key.

10. A wireless telephone, comprising:
   a. a wireless telephone communication circuit;
   b. a battery that powers the wireless telephone communication circuit, the battery storing a key and employing an authentication circuit that applies an authentication algorithm to the key and to a challenge received from the telephone thereby generating a response corresponding to the challenge;
   c. a memory that stores a set of challenges and a set of pre-computed responses, each response corresponding to a different challenge of the set of challenges; and
   d. a processor that transmits a selected challenge of the set of challenges to the battery and that receives a response from the battery, wherein the processor also compares the response received from the battery to a response stored in the memory corresponding to the challenge sent to the battery and wherein the processor causes a selected one of the battery and the wireless telephone communication circuit to inhibit charging of the battery when the response received from the battery does not correspond to the response corresponding to the challenge stored in the memory.

11. The wireless telephone of claim 10, wherein the authentication algorithm comprises a cryptographic hashing algorithm.

12. The wireless telephone of claim 10, wherein the authentication algorithm comprises an encryption algorithm.

13. The wireless telephone of claim 10, wherein the other than normal operating state comprises recharging the battery to a level that is less than a maximum recharge level for the battery.

14. The wireless telephone of claim 10, wherein the other than normal operating state comprises inhibiting communications through the telephone communication circuit.

15. A method of authenticating accessories configured to work with a device, the device comprising a charging circuit, the method comprising the actions of:
   a. applying an authentication algorithm to a set of challenges and a key, thereby generating a corresponding set of responses;
   b. storing the set of challenges and the corresponding set of responses, without storing the key, in a memory associated with the device;
   c. transmitting a challenge from the set of challenges to a battery having circuitry that applies the challenge and the key to the authentication algorithm and that generates a response based on the challenge and the key;

d. receiving the response from the battery;

e. comparing the response received from the battery to the response stored in the memory that corresponds to the challenge sent to the battery; and f. if the response received from the battery matches the response corresponding to the challenge sent to the battery, then allowing the charging circuit to charge the battery, otherwise preventing the charging circuit from charging the battery.

16. The method of claim 15, wherein the authentication algorithm comprises a cryptographic hashing algorithm.

17. The method of claim 15, wherein the authentication algorithm comprises an encryption algorithm.

* * * * *